(12) United States Patent
Kim et al.

(10) Patent No.: US 8,581,854 B2
(45) Date of Patent: Nov. 12, 2013

(54) MOBILE TERMINAL AND METHOD OF GENERATING KEY SIGNAL THEREIN

(75) Inventors: Young Hwan Kim, Gwangmyeong-si (KR); Seung Woo Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 1116 days.

(21) Appl. No.: 12/131,729

(22) Filed: Jun. 2, 2008

(65) Prior Publication Data

US 2008/0305836 A1    Dec. 11, 2008

(30) Foreign Application Priority Data

Jun. 7, 2007  (KR) .................. 10-2007-0055490

(51) Int. Cl.
*G06F 3/041* (2006.01)
(52) U.S. Cl.
USPC ..................... 345/173; 715/700; 715/864
(58) Field of Classification Search
USPC ................. 345/173–175; 715/700, 864
See application file for complete search history.

(56) References Cited

U.S. PATENT DOCUMENTS

| | | | |
|---|---|---|---|
| 6,369,803 B2 * | 4/2002 | Brisebois et al. | 345/173 |
| 6,424,338 B1 * | 7/2002 | Anderson | 345/173 |
| 6,459,424 B1 * | 10/2002 | Resman | 345/173 |
| 6,573,844 B1 * | 6/2003 | Venolia et al. | 341/22 |
| 6,940,494 B2 * | 9/2005 | Hoshino et al. | 345/173 |
| 7,002,556 B2 * | 2/2006 | Tsukada et al. | 345/173 |
| 7,012,595 B2 * | 3/2006 | Lu | 345/173 |
| 7,535,459 B2 * | 5/2009 | You et al. | 345/169 |
| 7,737,958 B2 * | 6/2010 | Jeon et al. | 345/173 |
| 7,821,425 B2 * | 10/2010 | Philipp | 341/33 |
| 7,903,092 B2 * | 3/2011 | Philipp | 345/173 |
| 2004/0136564 A1 * | 7/2004 | Roeber et al. | 382/100 |
| 2004/0212601 A1 * | 10/2004 | Cake et al. | 345/173 |
| 2005/0225540 A1 * | 10/2005 | Kawakami et al. | 345/173 |
| 2007/0087789 A1 * | 4/2007 | Lee et al. | 455/566 |
| 2007/0287494 A1 * | 12/2007 | You et al. | 455/550.1 |
| 2008/0158024 A1 * | 7/2008 | Steiner et al. | 341/34 |
| 2008/0165154 A1 * | 7/2008 | Kim | 345/173 |

FOREIGN PATENT DOCUMENTS

| | | | |
|---|---|---|---|
| JP | 2003271310 A | * | 9/2003 |
| KR | 10-2005-0054274 A | | 6/2005 |
| KR | 10-2006-0055027 A | | 5/2006 |
| KR | 2006055027 A | * | 5/2006 |

OTHER PUBLICATIONS

Machine Translation of KR-2006055027A.*

* cited by examiner

*Primary Examiner* — Jason Mandeville
(74) *Attorney, Agent, or Firm* — Birch, Stewart, Kolasch & Birch, LLP

(57) ABSTRACT

A mobile terminal and method of generating a key signal therein are disclosed, by which the key signal can be generated in a manner of adjusting touch sensitivity. The present invention includes a touchpad for a key signal input, a controller generating a key signal corresponding to a touched position if the touchpad is touched by a user and a strength of the touch is equal to or greater than a reference value, and a sensitivity adjusting unit adjusting the reference value.

12 Claims, 8 Drawing Sheets

(a)        (b)

MOBILE TERMINAL AND METHOD OF GENERATING KEY SIGNAL THEREIN

CROSS REFERENCE TO RELATED APPLICATIONS

This application claims the benefit of the Korean Patent Application No. 10-2007-0055490, filed on 7 Jun. 2007, which is hereby incorporated by reference as if fully set forth herein.

BACKGROUND OF THE INVENTION

1. Field of the Invention

The present invention relates to a mobile terminal, and more particularly, to a mobile terminal and method of generating a key signal therein. Although the present invention is suitable for a wide scope of applications, it is particularly suitable for generating a key signal in a mobile terminal having a touchpad.

2. Discussion of the Related Art

Generally, a mobile terminal is provided with an input device for a key signal input. And, a user is able to input a key signal.

Recently, in order to facilitate a user to input a key signal, a mobile terminal tends to be equipped with various input devices. And, one of the various input devices is a touch type input device.

However, sensitivity to a touch is fixed in a mobile terminal having a touch type input device according to a related art. So, a user is unable to adjust sensitivity separately and thus it may be inconvenient to input a key signal using a conventional touch type input device.

SUMMARY OF THE INVENTION

Accordingly, the present invention is directed to a mobile terminal and method of generating a key signal therein that substantially obviate one or more problems due to limitations and disadvantages of the related art.

An object of the present invention is to provide a mobile terminal and method of generating a key signal therein, by which the key signal can be generated in a manner of adjusting touch sensitivity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchpad for a key signal input, a controller generating a key signal corresponding to a touched position if the touchpad is touched by a user and a strength of the touch is equal to or greater than a reference value, and a sensitivity adjusting unit adjusting the reference value.

In another aspect of the present invention, a method of generating a key signal in a mobile terminal, having a touchpad includes detecting a touch of the touchpad by a user, and generating the key signal corresponding to a touched position of the touchpad if a strength of the touch is equal to or greater than a reference value, wherein the reference value is adjustable.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

A mobile terminal according to one embodiment of the present invention and a method of generating a key signal therein are explained with reference to the accompanying drawings as follows.

A mobile terminal described in this disclosure may include an electronic device portable by a user. For instance, the mobile terminal includes one of a mobile phone, a digital broadcasting terminal, an MP3 player, a PDA (personal digital assistants), a PMP (portable multimedia player) and the like.

Figure 1:
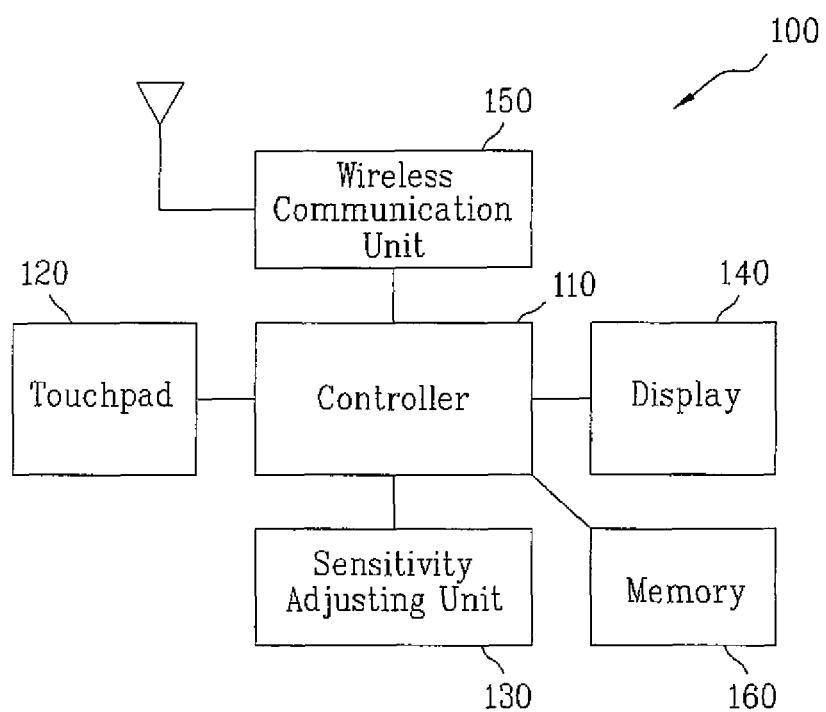
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a controller 110, a touchpad 120, a sensitivity adjusting unit 130, a display 140, a wireless communication unit 150 and a memory 160. The mobile terminal 100 shown in the drawing just means a single embodiment only, by which the present invention is not restricted. In particular, elements of the embodiment shown in the drawing can be omitted in part to configure a mobile terminal of the present invention or elements not shown in the drawing can be added to a mobile terminal of the present invention in accordance with an embodiment type.

Figure 2:
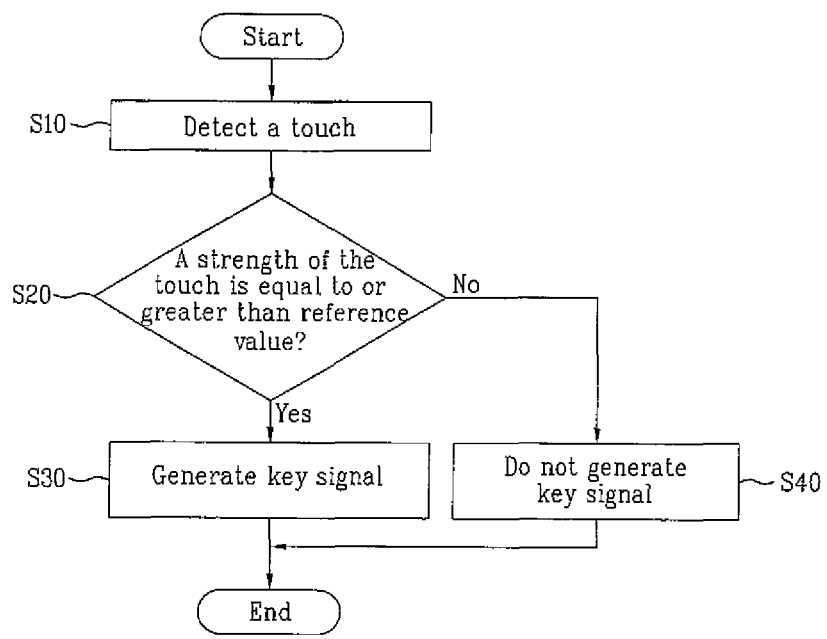
FIG. 2 is a flowchart for a method of generating a key signal in a mobile terminal according to one embodiment of the present invention.

FIG. 2 is a flowchart for a method of generating a key signal in a mobile terminal according to one embodiment of the present invention.

Referring to FIG. 1 and FIG. 2, in case that the touchpad 120 of the mobile terminal 100 is touched, the controller 110 is able to detect the touch [S10]. The touch to the touchpad 120 can be carried out using a user's finger. In this case, the touchpad 120 is an input device for a key signal input to the mobile terminal.

Meanwhile, the controller 110 is able to generate a specific key signal corresponding to a touched position only if a strength of the touch is equal to or greater than a reference value [S20, S30]. So, if the strength of the touch is smaller than the reference value, the controller 110 may not generate a key signal [S20, S40].

The reference value can be regarded as an example of a threshold value for a keys signal generation. And, the reference value can be stored as a default in the memory 160.

The reference value can be adjusted via the sensitivity adjusting unit 130. If the reference value is adjusted, the controller 110 is able to generate a specific key signal corresponding to a touched position only if a strength of the touch is equal to or greater than the adjusted reference value. And, the reference value in the adjusted state can be stored in the memory 160.

The wireless communication unit 150 performs radio-frequency processing on a signal for wireless communication. For instance, the wireless communication unit 150 modulates a signal into a radio-frequency signal for transmission and demodulates a received radio-frequency signal.

Figure 3:
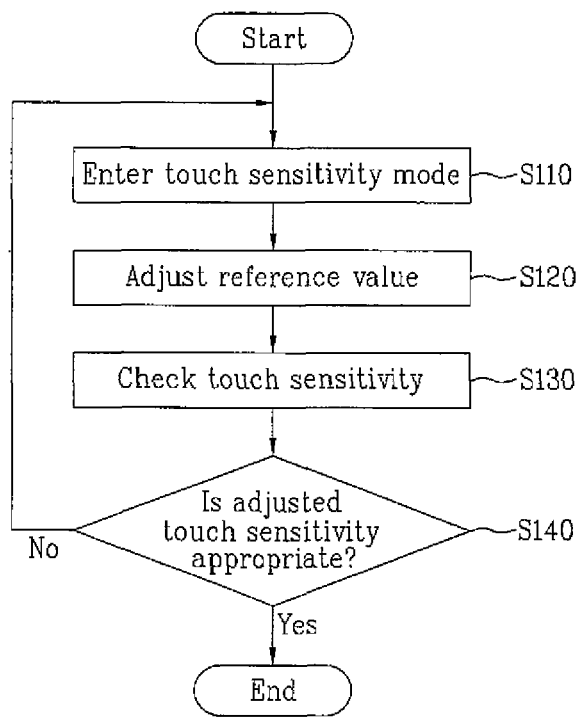
FIG. 3 is a flowchart for a method of adjusting a reference value in the mobile terminal shown in FIG. 1.

FIG. 3 is a flowchart for a method of adjusting the reference value according to one embodiment of the present invention.

Referring to FIG. 3, a touch sensitivity mode can be entered via a key signal input [S110]. In this case, the key signal input can be carried out via the touchpad 120 or an input device (not shown in the drawing) provided to the mobile terminal 100 regardless of the touchpad 120.

The touch sensitivity mode entry can be carried out via a menu key input or a specific shortcut key input.

If the touch sensitivity mode is entered via the menu or shortcut key input, the sensitivity adjusting unit 130 is able to adjust a reference value. For instance, the sensitivity adjusting unit 130 can raise or lower a set reference value. And, the sensitivity adjusting unit 130 can select a defaulted reference value [S120]. It is understood that the defaulted reference value can be modified via a user's key manipulation. Thus, if the reference value is adjusted, a user is able to confirm the adjusted reference value on an idle image [S130].

If a user is satisfied with the reference value adjusted via the steps S10 to S130, the reference value adjusting process is completed. Otherwise, the user can repeat the steps S110 to S130.

The above-explained reference value can be an index that indicates touch sensitivity of the touchpad 120. For instance, the lower the reference value becomes, the more sensitive to the touch the touchpad 120 becomes. The higher the reference value becomes, the less sensitive to the touch the touchpad 120 becomes.

Figure 4:
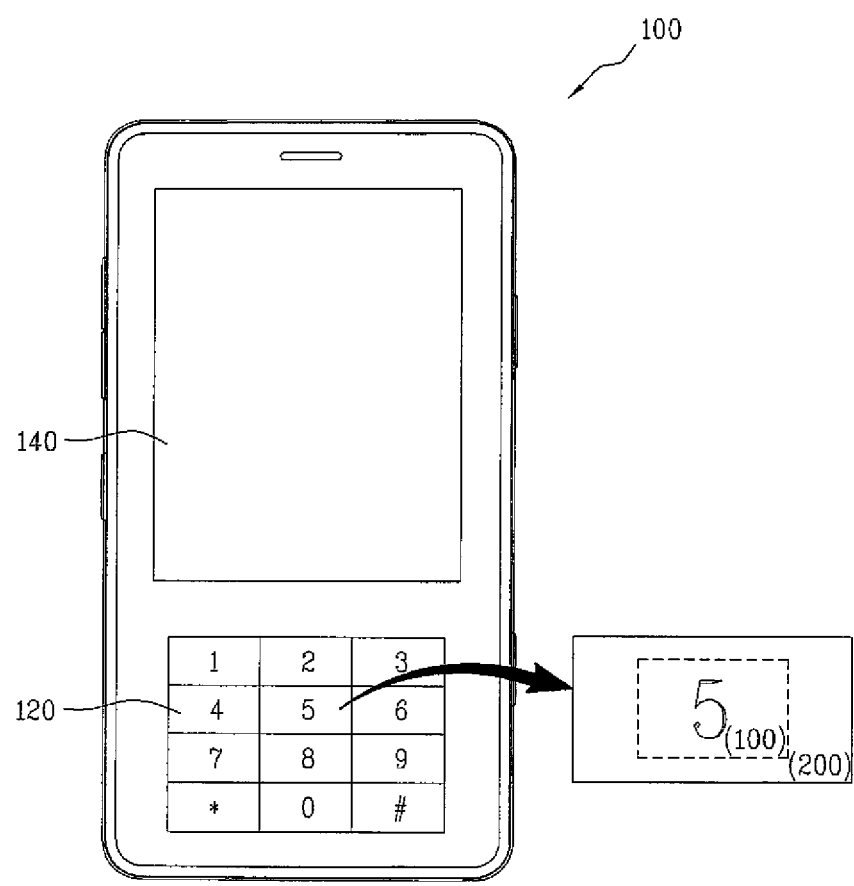
FIG. 4 is a diagram of a mobile terminal to explain an example that the reference value adjusted by the method shown in FIG. 3 is differently applied per an area.

According to one embodiment of the present invention, the reference value is collectively applicable to the touchpad 120 or differently applicable to the touchpad 120 per an area. FIG. 4 is a diagram of a mobile terminal to explain an example that the reference value is differently applied per an area.

Referring to FIG. 4, a reference value for a central part (indicated by a dotted line) of a numeral key '5' is set to 100 and a reference value of a peripheral part thereof is set to 200. Thus, if the reference values are set, the central part is more sensitive to a touch and the peripheral part is less sensitive to a touch. So, even if two keys are simultaneously pressed, the controller 110 can decide an input of a single key signal.

Hence, the controller 110 is able to generate a key signal corresponding to a position from which a touch having a strength equal to or greater than the reference value is detected. For instance, assuming that a user's finger simultaneously presses both a numeral key '5' and a numeral key '6', if most of the user's finger touches the numeral key '5' while the reset of the user's finger touches the numeral key '6', the controller 110 is able to generate a key signal corresponding to the numeral key '5' only by considering the reference value (reference value of central part is low, reference value of peripheral part is high).

Meanwhile, the touchpad 120 of the mobile terminal 100 according to one embodiment of the present invention can form a mutual layer structure with the display 140.

In one embodiment, a key icon can be displayed on the display 140 to generate a key signal input from the touchpad 120.

In this disclosure, an example of 'key icon' is a keypad displayed on the display 140. Through the keypad, numeral keys, character keys, navigation keys and the like can be inputted. So, the key icon (cf. '141' in FIG. 5) is able to generate the key signal input from the touchpad 120.

According to one embodiment of the present invention, the controller 110 is able to vary a size of the key icon 141 in accordance with a reference value modification by the sensitivity adjusting unit 130.

Figure 5:
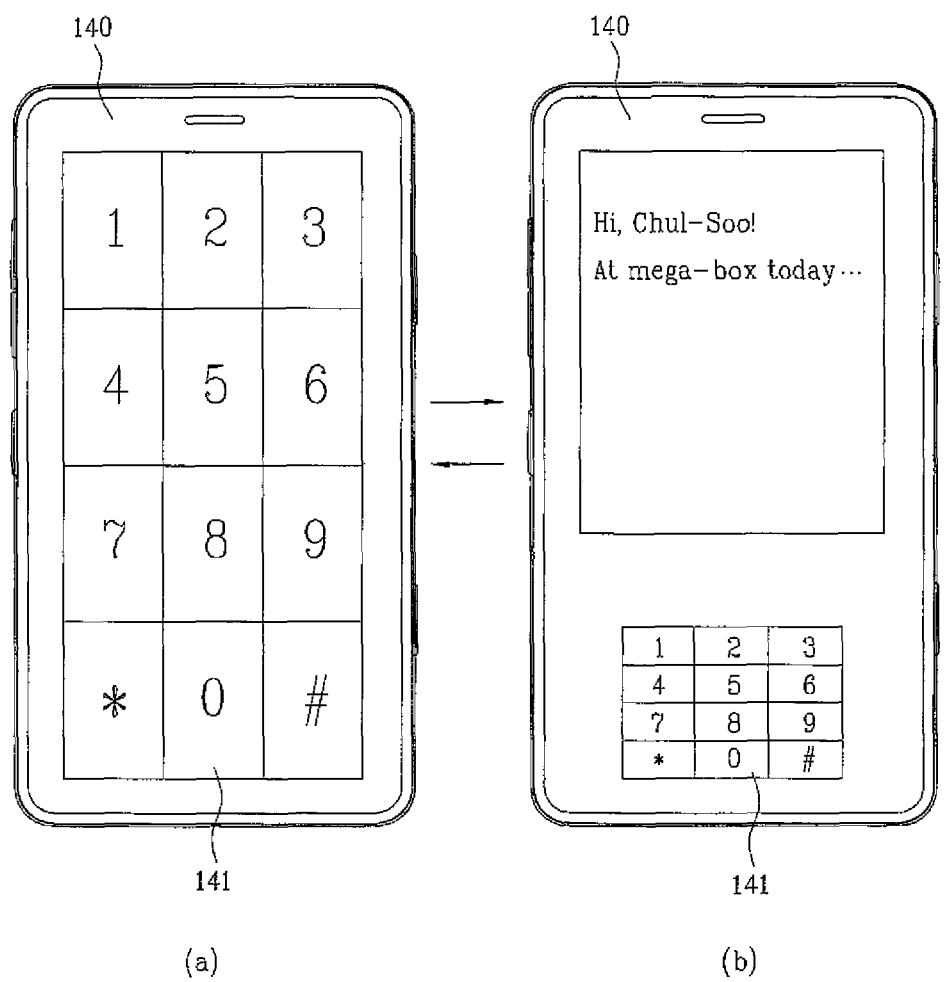
FIGS. 5 to 8 are diagrams to explain a method of generating a key signal in a mobile terminal according to one embodiment of the present invention.

As mentioned in the foregoing description, the variation example of the key icon 141 is shown in FIG. 5.

If the reference value is modified higher (i.e., sensitivity of touch is lowered), the key icon 141, as shown in (a) of FIG. 5, is displayed larger. If the reference value is modified lower (i.e., sensitivity of touch is raised), the key icon 141, as shown in (b) of FIG. 5, is displayed smaller.

For instance, in case that a user has poor vision or weak motor skills, the user causes the mobile terminal 100 to display the key icon 141, as shown in (a) of FIG. 5, relatively larger to enhance convenience for the key signal input. In case that a user has good vision or strong motor skills, the user causes the mobile terminal 100 to display the key icon 141, as shown in (b) of FIG. 5, smaller to receive more commands.

According to one embodiment of the present invention, the reference value can vary in accordance with a mode selection of a displayed image. In particular, a first image mode has a touch sensitivity relatively less sensitive and a second image mode has a touch sensitivity relatively more sensitive.

For instance, if a user with poor vision or with weak motor skills, the user causes the mobile terminal 100 to select the first image mode and displays the key icon 141, as shown in (a) of FIG. 5, in a large size to enhance convenience for key signal input. In this case, the reference value is relatively higher than the reference value of the second image mode.

If a user is a user with good vision or strong motor skills, the user causes the mobile terminal 100 to select the second image mode and displays the key icon 141, as shown in (b) of FIG. 5, in a small size to receive more commands. In this case, the reference value is relatively lower than the reference value of the first image mode.

In the above-explained embodiment, the varying reference value and the varying size of the key icon 141 can be stored and memorized in the memory 160.

Conversely, in another embodiment, the sensitivity of the touch screen may vary upon selection of a display size. That is, if a user selects the larger key display of FIG. 5A, the sensitivity of the keys automatically drops. And when a user selects the smaller key display of FIG. 5B, the sensitivity of the keys automatically increases.

Figure 6:
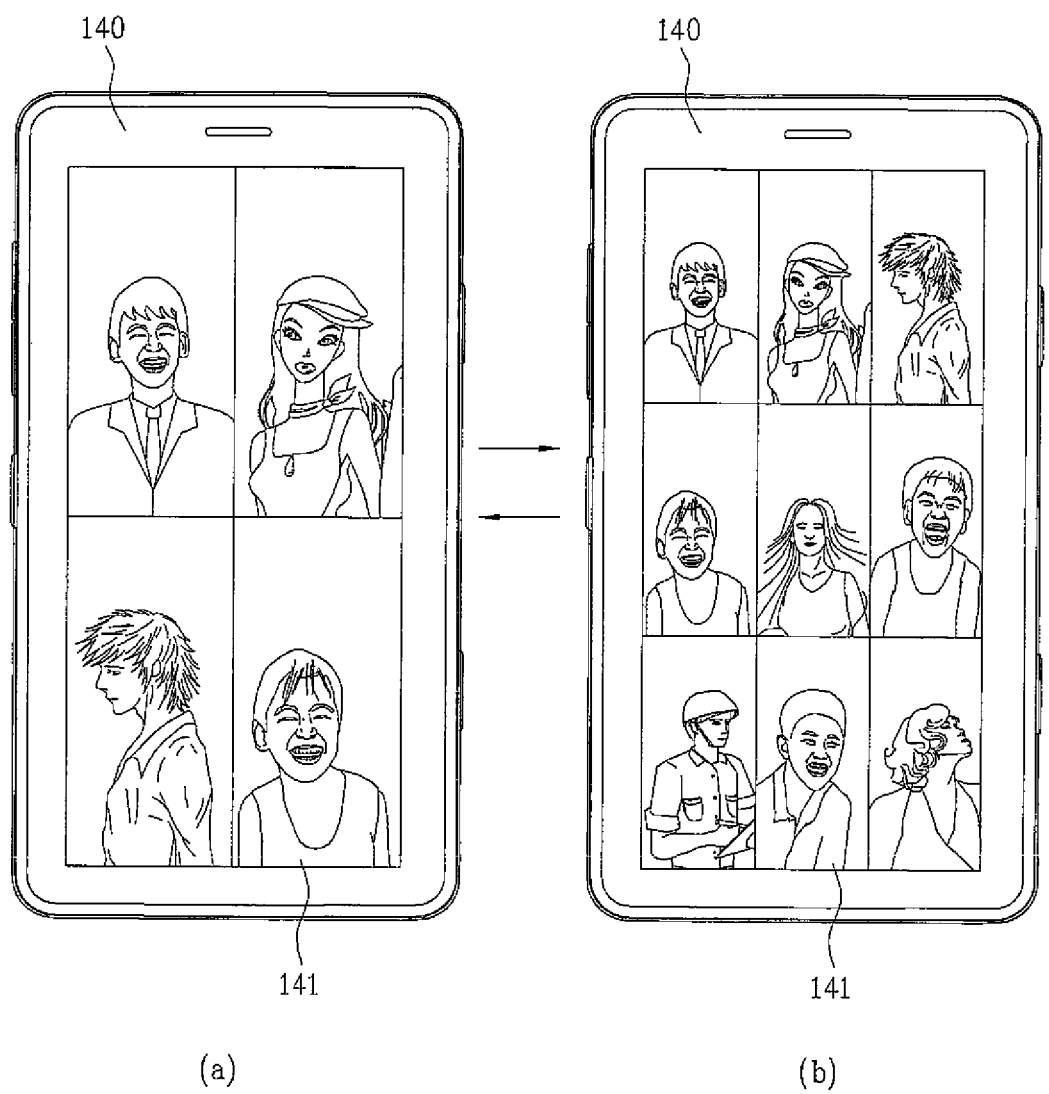

According to one embodiment of the present invention, the controller 110 is able to display a phonebook image in a prescribed area of the key icon 141. This example is shown in FIG. 6. For instance, an area provided for a numeral key input can become the prescribed area of the key icon 141.

For instance, if a user has poor vision or weak motor skills, the user causes the mobile terminal 100 to select the first image mode and displays the phonebook image, as shown in (a) of FIG. 6, in a large size to enhance convenience for key signal input. In this case, the reference value is relatively higher than the reference value of the second image mode.

If a user has good vision or strong motor skills, the user causes the mobile terminal 100 to select the second image mode and displays the phonebook image, as shown in (b) of FIG. 6, in a small size to display a greater number of phonebook images. In this case, the reference value is relatively lower than the reference value of the first image mode.

Namely, according to one embodiment of the present invention, the controller 110 is able to vary the number of the displayed phonebook images in accordance with the reference value. The varied phonebook image number can be stored and memorized in the memory 160.

In the case shown in (a) or (b) of FIG. 6, it is able to display a different phonebook image using a scroll key (not shown in the drawing) or a navigation key (not shown in the drawing).

In this case, if a key signal is inputted by having a displayed phonebook image touched, the controller 110 is able to make a call to a phone number that matches the phonebook image. Namely, a user of the mobile terminal 100 is able to make a call in a simple manner by confirming the displayed phonebook image only.

Besides, the displayed phonebook image can be interconnected to an abbreviated number.

For instance, an image interconnected to an abbreviated number '1' can be displayed in an area of the key icon 141 provided for an input of a numeral key '1'. And, an image interconnected to an abbreviated number '2' can be displayed in an area of the key icon 141 provided for an input of a numeral key '2'.

According to one embodiment of the present invention, in case that a reference value is modified by the sensitivity adjusting unit 130, the controller 110 is able to generate a key signal by subdividing an area of the touchpad 120 corresponding to a specific key signal input of the key icon.

In this case, the specific key signal can include a navigation key signal.

Figure 7:
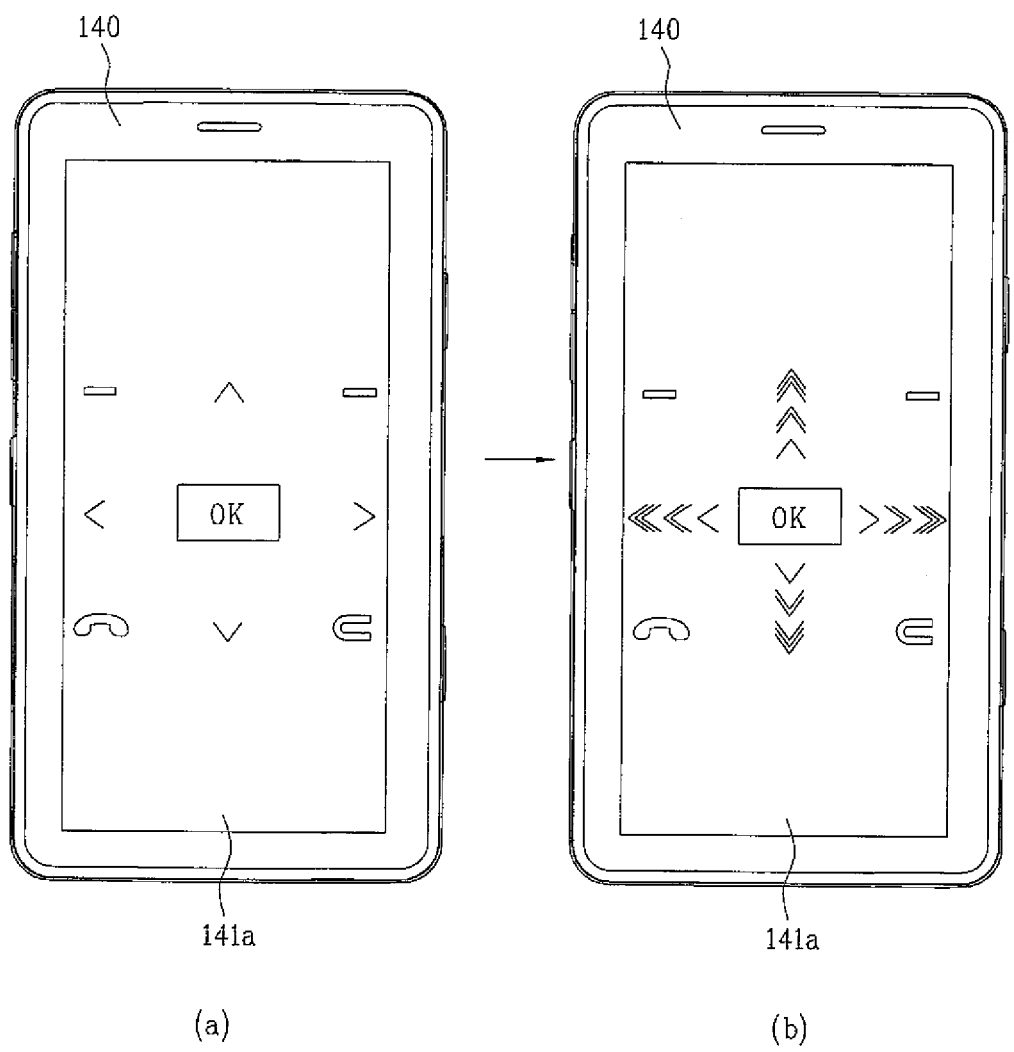

FIG. 7 is a diagram to explain a key signal generating method in case that a specific key relevant to area subdivision of the touchpad 120 s a navigation key.

In (a) of FIG. 7, depicted is a case that a reference value is set high when a navigation key 141a is allocated to a touchscreen. In the case shown in (a) of FIG. 7, for instance, when a key signal identically works on any part of an area allocated to a left direction key, if an area of the touchpad 120 relevant to the left direction key is touched once, the controller 110 shifts a position of a cursor or a position of a highlight in a left direction by a single space. Namely, in (a) of FIG. 7, depicted is a case that an area of the touchpad 120 is not subdivided.

In (b) of FIG. 7, depicted is a case that a reference value is set low when a navigation key 141a is allocated to a touchscreen. In this case, the controller 110 divides a left direction key into three equal parts. And, the controller 110 generates a key signal of a cursor or highlight position shift command for shifting three spaces to correspond to an outer part, a key signal of a cursor or highlight position shift command for shifting two spaces to correspond to a middle part, and a key signal of a cursor or highlight position shift command for shifting one space to correspond to an inner part.

It is understood that the above description is identically applied to a right direction key, a down-direction key and an up-direction key.

According to one embodiment of the present invention, the controller 110 is able to differentiate an extent of subdivision in accordance with a reference value variation (sensitivity variation to a touch). For instance, if a reference value gets lower than that of the case shown in (b) of FIG. 7, an area can be subdivided into five equal parts. The subdivision extent can be stored and memorized in the memory 160.

According to one embodiment of the present invention, if a specific area of the touchpad 120 relevant to a specific key signal from the key icon 141 is touched, the controller 110 enlarges and displays the touched specific area. This example is shown in FIG. 8.

Figure 8:
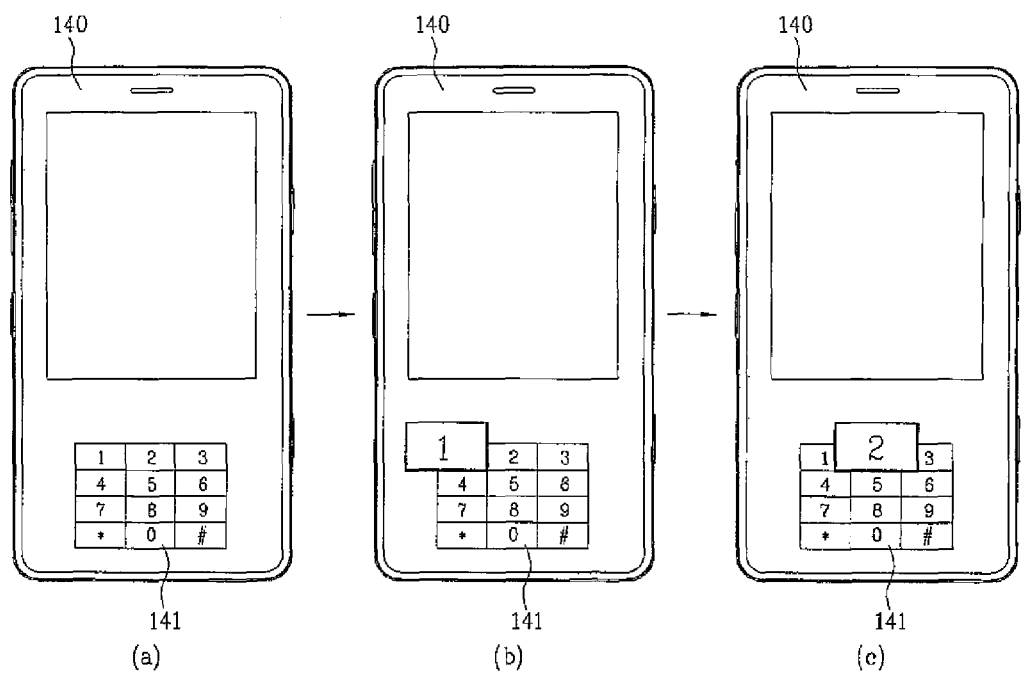

In (a) of FIG. 8, depicted is a case that the key icon 141 is not touched. In (b) of FIG. 8, depicted is a case that an area corresponding to a numeral key '1' is enlarged and displayed if the numeral key '1' of the key icon 141 is touched. In (c) of FIG. 8, depicted is a case that an area corresponding to a numeral key '2' is enlarged and displayed if the numeral key '2' of the key icon 141 is touched. Thus, if the touched area is enlarged and displayed, a user is able to make sure what kind of key the user has touched.

Accordingly, the present invention generated a key signal by adjusting touch sensitivity in a mobile terminal having a touchpad, thereby enhancing user's convenience in inputting key signals.

Various embodiments described herein may be implemented in a computer-readable medium using, for example, computer software, hardware, or some combination thereof. For a hardware implementation, the embodiments described herein may be implemented within one or more application specific integrated circuits (ASiCs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display including a touchpad;
   a memory configured to store a phonebook including a plurality of images;
   a sensitivity adjusting unit configured to adjust a threshold value; and
   a controller operatively connected to the display and configured to:

control the display to display a keypad which is divided into a plurality of key icons, wherein each of the plurality of key icons displays an image stored in the phonebook, generate a key signal corresponding to a key icon among the plurality of key icons when the key icon is touched and a strength of the touch is equal to or greater than the threshold value, enlarge a size of the displayed images when the sensitivity adjusting unit increases the threshold value, and reduce the size of the displayed images when the sensitivity adjusting unit decreases the threshold value.

2. The mobile terminal of claim 1, wherein the sensitivity adjusting unit is configured to adjust the threshold value in response to a user input.

3. The mobile terminal of claim 1, wherein the controller is configured to initiate a call to a phone number stored in the phonebook matching an image of the displayed images upon recognizing a touch to the displayed image.

4. The mobile terminal of claim 1, wherein the controller is configured to vary a number of the displayed images stored in the phonebook when the threshold value is adjusted.

5. The mobile terminal of claim 4, wherein the controller is configured to increase the number of displayed images stored in the phonebook when the threshold value is decreased and to decrease the number when the threshold value is increased.

6. The mobile terminal of claim 1, wherein the controller is configured to generate the key signal by subdividing an area of the touchpad corresponding to a specific key signal when the threshold value is adjusted by the sensitivity adjusting unit.

7. A method of generating key signals in a mobile terminal having a touchpad, the method comprising:

storing a phonebook including a plurality of images in a memory;

adjusting a threshold value in a sensitivity adjusting unit;

displaying a keypad which is divided into a plurality of key icons, wherein each of the plurality of key icons displays an image stored in the phonebook;

generating a key signal corresponding to a key icon of the plurality of key icons when the key icon is touched and a strength of the touch is equal to or greater than the threshold value;

enlarging a size of the displayed images when the sensitivity adjusting unit increases the threshold value; and reducing the size of the displayed images when the sensitivity adjusting unit decreases the threshold value.

8. The method of claim 7, wherein the step of adjusting the threshold value comprises:

adjusting the threshold value in response to a user input.

9. The method of claim 7, further comprising:

initiating a call to a phone number stored in the phonebook matching an images of the displayed images upon recognizing a touch to the displayed image.

10. The method of claim 7, further comprising:

varying a number of the displayed images stored in the phonebook when the threshold value is adjusted.

11. The method of claim 10, the step of varying the number of the displayed images stored in the phonebook comprising:

increasing the number when the threshold value is decreased; and decreasing the number when the threshold value is increased.

12. The method of claim 7, further comprising:

generating the key signal by subdividing an area of the touchpad corresponding to a specific key signal when the threshold value is adjusted.

* * * * *